United States Patent
DePoi et al.

(10) Patent No.: US 7,944,167 B2
(45) Date of Patent: May 17, 2011

(54) METHOD AND APPARATUS FOR IMPROVING THE POSITION ACCURACY OF A SERVO MOTOR

(75) Inventors: Arthur H. DePoi, Brookfield, CT (US); John W. Sussmeier, Cold Spring, NY (US)

(73) Assignee: Pitney Bowes Inc., Stamford, CT (US)

( * ) Notice: Subject to any disclaimer, the term of this patent is extended or adjusted under 35 U.S.C. 154(b) by 524 days.

(21) Appl. No.: 12/145,790

(22) Filed: Jun. 25, 2008

(65) Prior Publication Data

US 2009/0322275 A1 Dec. 31, 2009

(51) Int. Cl.
*G05B 5/01* (2006.01)

(52) U.S. Cl. .................. 318/619; 318/610; 318/567

(58) Field of Classification Search .......... 318/619, 318/610, 567, 568.22; 356/431, 73; 226/111
See application file for complete search history.

(56) References Cited

U.S. PATENT DOCUMENTS

2004/0217143 A1* 11/2004 Berg et al. .................. 226/118.2

* cited by examiner

*Primary Examiner* — Karen Masih
(74) *Attorney, Agent, or Firm* — Michael J. Cummings; Charles R. Malandra, Jr.

(57) ABSTRACT

A method of operating a motor controlled by a closed loop servo control system is provided. The closed loop servo control system employs a digital filter, such as a PID filter, that employs one or more gain coefficients. The method includes temporarily increasing one or more of the gain coefficients by a corresponding first predetermined amount when the motor reaches a coefficient boost motor position that is a predetermined distance before a commanded motor rest position, and decreasing the one or more of the gain coefficients by a corresponding second predetermined amount a predetermined time after the motor reaches the commanded motor rest position.

13 Claims, 2 Drawing Sheets

METHOD AND APPARATUS FOR IMPROVING THE POSITION ACCURACY OF A SERVO MOTOR

FIELD OF THE INVENTION

The present invention relates to control of servo motors used, for example, in paper handling systems and, in particular, to a method and apparatus for improving the position accuracy of a servo motor. In one particular embodiment, the invention relates to a method and apparatus for improving the cut accuracy of a web cutter used in, for example, an inserter system to cut a continuous paper web into sheets.

BACKGROUND OF THE INVENTION

Inserter systems are typically used by organizations such as banks, insurance companies and utility companies for producing a large volume of specific mailings where the contents of each mail item are directed to a particular addressee. In many respects, a typical inserter system resembles a manufacturing assembly line. Sheets and other raw materials (e.g., enclosures and envelopes) enter the inserter system as inputs. Then, a plurality of different modules or workstations in the inserter system work cooperatively to process sheets until a finished mail piece is produced.

Typically, inserter systems prepare mail pieces by gathering collations of documents on a conveyer. The collations are then transported on the conveyer to an insertion station where they are automatically stuffed into envelopes. After being stuffed with the collations, the envelopes are removed from the insertion station for further processing, such as automated closing and sealing of the envelopes, weighing of the envelopes, applying postage to the envelopes, and finally sorting and stacking the envelopes.

At the input end of a typical inserter system, rolls or stacks of continuous printed documents, called a web, are fed into the inserter system by a web feeder. As will be appreciated, the continuous web must be separated into individual documents pages. This separation is typically carried out by a web cutter that uses a blade forming a part of guillotine cutting module to cut the continuous web into individual document pages.

In one type of web cutter, called a pinned web cutter, the web is provided with sprocket holes on both sides thereof and is fed from a fanfold stack or a roll into the web cutter. The web cutter has a tractor with pins or a pair of moving belts with sprockets to move the web toward the guillotine cutting module for cutting the web cross-wise into separate sheets. Perforations are provided on each side of the web so that the sprocket hole sections of the web can be removed from the sheets prior to moving the cut sheets to other components of the inserter system.

In an alternative type of web cutter, the continuous web is moved by a pair of control nips. Such a system is referred to as a pinless cutter as the continuous web of material does not need to be provided with the sprocket holes described above.

Cut sheet length accuracy and repeatability are critical characteristics for a high speed web cutter. These characteristics are directly correlated to the accuracy and repeatability of an output shaft of a servo motor that controls the motion of a paper web handling device. For a pinned cutter, the paper web handling device is typically a set of tractors and for a pinless cutter, the paper web handling device is typically one or more control nips. For both types of cutters, the web advances beneath a guillotine cutting module having a blade that is located above the web. When the web has advanced almost one cut sheet length, the blade begins a downward motion towards the web. Once the web has come to rest, the blade strikes the paper making a cut. Such feed and cut cycles are carried out in an alternate fashion during the operation of the paper handling device.

It has been found that the accuracy and repeatability of cut sheets varies during operation of web cutters for several reasons, which are described in more detail elsewhere herein.

SUMMARY OF THE INVENTION

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

In one embodiment, the invention provides a method of operating a motor controlled by a closed loop servo control system. The closed loop servo control system employs a digital filter, such as a PID filter, that employs one or more gain coefficients. In the case of a PID filter, the gain coefficients may include a proportional gain coefficient, $K_p$, an integral gain coefficient, $K_i$, and a derivative gain coefficient, $K_d$.

The method includes temporarily increasing one or more of the gain coefficients (such as $K_p$ and $K_d$) by a corresponding first predetermined amount when the motor reaches a coefficient boost motor position that is a predetermined distance before a commanded motor rest position, and decreasing the one or more of the gain coefficients (such as $K_p$ and $K_d$) by a corresponding second predetermined amount a predetermined time after the motor reaches the commanded motor rest position. In some embodiments, the first and second predetermined amounts are the same such that the coefficients are returned to their original, pre-boost values.

In another embodiment, the invention provides a motor control system that includes a motor and a closed loop servo control system controlling the motor. The closed loop servo control system employs a digital filter, such as a PID filter, that employs one or more gain coefficients. The closed loop servo control system is adapted to increase one or more of the gain coefficients by a corresponding first predetermined amount when the motor reaches a coefficient boost motor position that is a predetermined distance before a commanded motor rest position and decrease the one or more of the gain coefficients by a corresponding second predetermined amount a predetermined time after the motor reaches the commanded motor rest position.

In one embodiment, the invention provides a web cutter for cutting a web that includes a blade for selectively cutting the web, a web handling mechanism structured to selectively move the web toward the blade, and a motor system for driving the web handling mechanism. The motor system includes a motor and a closed loop servo control system controlling the motor that employs a digital filter employing one or more gain coefficients. The closed loop servo control system is adapted to increase one or more of the gain coefficients by a corresponding first predetermined amount when the motor reaches a coefficient boost motor position that is a predetermined distance before a commanded motor rest position, wherein the commanded motor rest position corresponds to a position of the web handling mechanism at which the blade cuts the web, and decrease the one or more of the gain coefficients by a corresponding second predetermined amount a predetermined time after the motor reaches the commanded motor rest position.

Aside from the structural and procedural arrangements set forth above, the invention could include a number of other arrangements, such as those explained hereinafter. It is to be understood that both the foregoing description and the following description are exemplary only.

BRIEF DESCRIPTION OF THE DRAWINGS

The accompanying drawings illustrate exemplary embodiments of the invention, and together with the general description given above and the detailed description given below, serve to explain the principles of the invention. As shown throughout the drawings, like reference numerals designate like or corresponding parts.

DETAILED DESCRIPTION OF EXEMPLARY EMBODIMENTS

The present invention, in one particular embodiment, provides a method and apparatus for improving the cut sheet length accuracy and repeatability of a web cutter of a paper handling system. For illustrative purposes, the present invention will be described as implemented in the web cutter 2 shown in FIG. 1, which forms a part of an inserter system. It should be understood that this is meant to be exemplary only, and should not be considered to be limiting, as the present invention may be implemented in web cutters having different configurations and/or components than those shown in FIG. 1, and/or in web cutters used in paper handling systems other than an inserter system. In addition, the use of present invention is not limited to web cutters, but instead may be employed in any servo control device where a high level of position accuracy is momentarily desired.

For example, and without limitation, the backstop mechanism in an insertion engine executes a very rapid incremental motion profile (e.g., 20 ms duration). It is important the backstop mechanism overshoot is minimized at the end of this motion profile because at that instant, the high velocity envelope strikes the backstop mechanism and will tend to move it downstream in the direction of the motion profile overshoot. A repeatable desired resting position may be desirable because subsequent insertion mechanism operations are conducted with the envelope located at this position. Thus, the present invention may be employed to improve the accuracy and repeatability of the backstop mechanism position and, thus, the resting position of the envelope.

Figure 1:
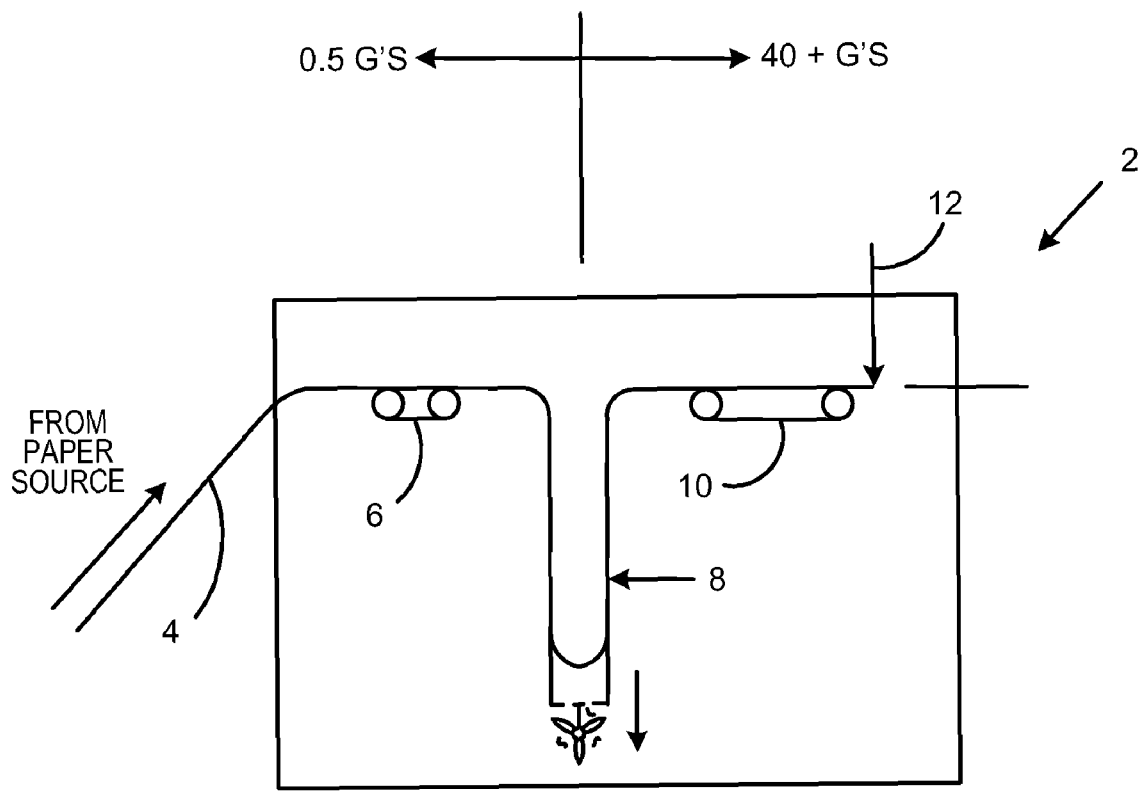
FIGS. 1 and 2 are schematic views of a web cutter implementing an embodiment of the present invention.

FIG. 1 is a schematic diagram of a pinned web cutter 2 in which the present invention may implemented according to one particular embodiment. Although a pinned web cutter 2 with tractor sets is described herein, it should be understood that tractor sets may be replaced by control nips and a suitable control means for a pinless cutter. Referring to FIG. 1, a paper web 4 is conveyed by a substantially constant velocity web handler tractor set 6 into a vacuum box 8. After the vacuum box 8, the web 4 is incrementally conveyed by a primary tractor set 10, one cut sheet length at a time, underneath a guillotine blade assembly 12. The vacuum box 8 is used to store the shrinking and growing web 4 and to keep it taut and under control as it is delivered to the guillotine blade assembly 12 for a subsequent cutting operation.

The operation of the guillotine blade assembly 12 begins slightly before the primary tractor set 10 brings the paper web to rest, but the blade of the guillotine blade assembly 12 does not physically strike the web 4 until the web is substantially at rest. This is purposely done to minimize cycle time, thereby increasing the throughput performance of the web cutter 2. As denoted in FIG. 1, paper web accelerations upstream of the vacuum box 8 are on the order of less than 0.5 Gs to accommodate start and stop conditions of the web cutter 2. Such low accelerations are advantageous as they minimize breakages of the web 4 between the web cutter 2 and an upstream paper source (not shown).

Downstream of the vacuum box 8, accelerations are on the order of 40 Gs to accommodate the rapid incremental start/stop motion of the continuous web 4 for steady state cutting to produce cut sheets of a desired length at a desired rate (e.g., 12 inch long cut sheets at a rate of 10 cuts per second; for a 2-up web, this equates to 20 cut sheets per second).

Figure 2:
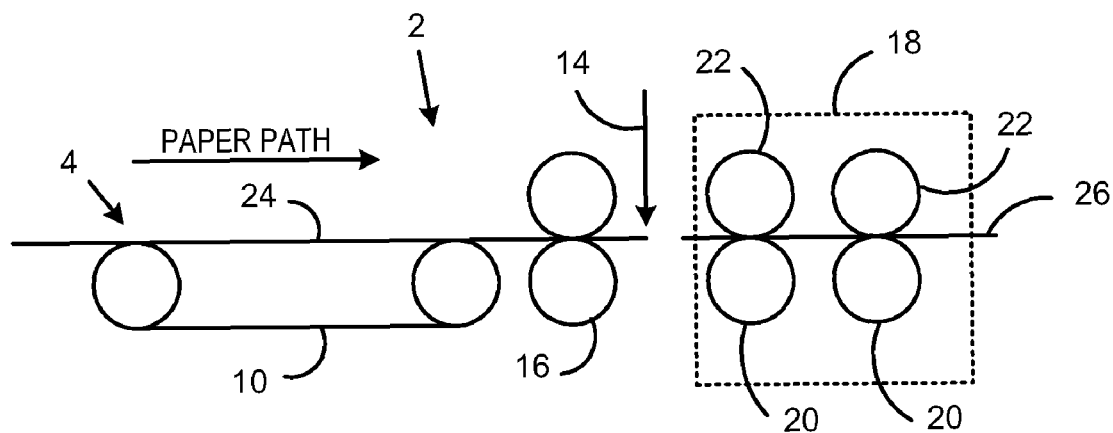

FIG. 2 is a schematic diagram of a portion of the web cutter 2 which shows the primary tractor set 10, the blade 14 of the guillotine blade assembly 12, a slitter assembly 16, and an ejection roller assembly 18. The ejection roller assembly 18 consists of two constant velocity driven log rollers 20 with a plurality of spring loaded idlers 22 riding on each.

During operation, the ejection roller assembly 18 keeps the uncut portion 24 of the web 4 taut through the slitter assembly 16 and under the blade 14 for clean and reliable slitting and paper cutting. Two side slitters are generally used in the slitter assembly 16 to cut off the tractor holes of the web 4, and for 2-up applications, a third slitter is engaged in the center of web 4 for cutting the web 4 in half. The ejection roller assembly 18 also provides rapid ejection of cut sheets 26 downstream of the web cutter 2 to a receiving unit (not shown) once the blade 14 cuts through the web 4. Rapid ejection may be important because individual cut sheets 26 are ejected from the guillotine blade assembly 12 before the next paper web advance motion, so that the lead edge of the web 4 does not collide with the trail edges of the cut sheet 26 exiting the web cutter 2.

The log rollers 20 are driven at some constant velocity that is greater than the peak velocity of the incremental motion profile of the primary tractor set 10. This ensures that the web 4 is conveyed in a taut manner and does not jam while passing through the slitter assembly 16 and under the guillotine blade assembly 12. A downstream tug force on the web 4 is generated by the ejection roller assembly 18. The downstream tug force, F, is represented by the following equation: $F=\mu*N$, where $\mu$ is the dynamic coefficient of friction between the paper web 4 and the log rollers 20 and N is the sum of all normal forces of all of the sprung idlers 22 riding on the log rollers 20. Suitable values of $\mu$ and N are established to minimize the downstream tug force F, while still providing rapid and reliable cut sheet ejection for all different types of paper that may form the web 4 where $\mu$ will vary. As described in greater elsewhere herein, the magnitude of the force F will generate a position error on the primary tractor set 10 during the cutting operation.

Figure 3:
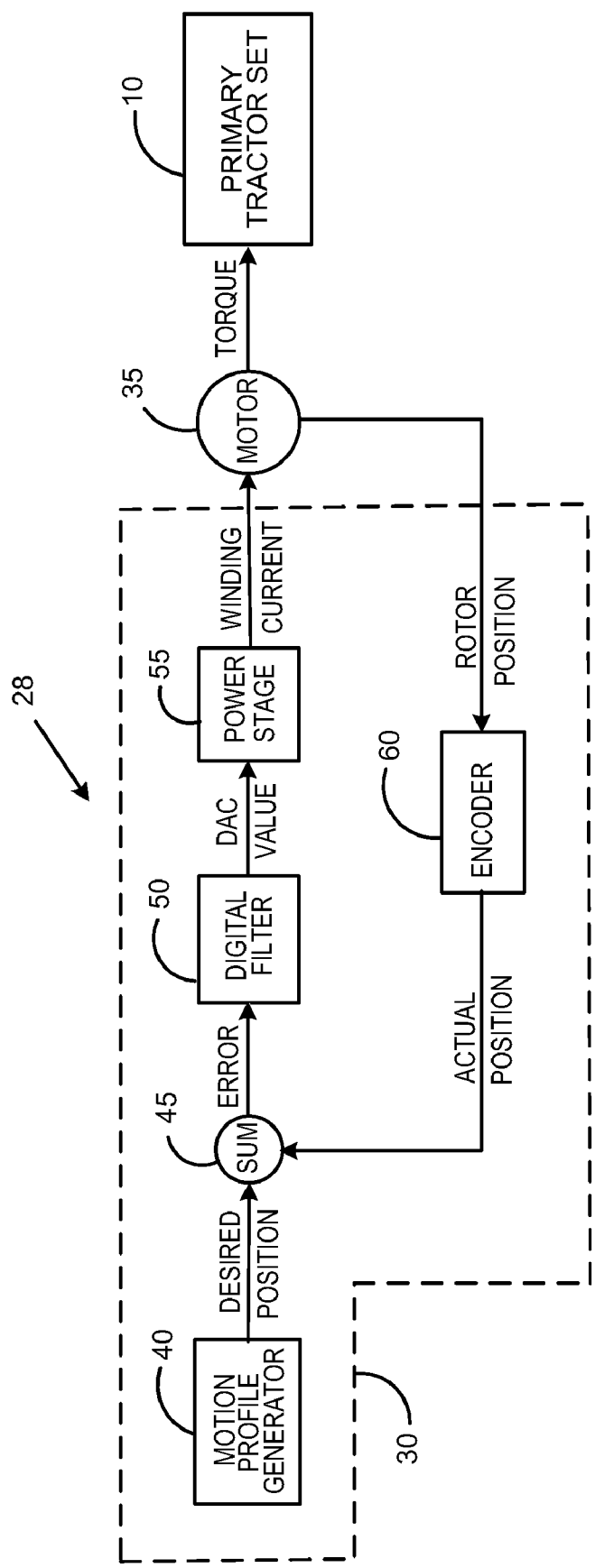
FIG. 3 is a block diagram of a motor system implementing an embodiment of the present invention in the web cutter of FIGS. 1 and 2.

FIG. 3 is a block diagram of a motor system 28 that, in one embodiment, may be used to implement the present invention in the web cutter 2 of FIGS. 1 and 2. As seen in FIG. 3, the motor system 28 includes a motor control subsystem 30, which, as described in greater detail below, controls the operation of an electric motor 35, which in turn outputs a torque which drives the primary tractor set 10. The motor 35 is what is commonly referred to as a servo motor. A servo motor, as that term is used herein, refers to a motor that is controlled based on a closed feedback loop, wherein the feedback is in the form of some motion parameter or attribute of the motor such as rotor position (i.e., angular position), rotor velocity, or rotor acceleration.

As seen in FIG. 3, the motor control subsystem 30 includes a motion profile generator 40, a summing junction 45, a digital filter 50, a power stage 55, and an encoder 60. The motion profile generator 40 generates and outputs a motion profile that is designed to selectively control the angular velocity of the rotor of the motor 35 in order to output a desired torque by controlling the angular position of the rotor over some period of time.

In particular, in the embodiment shown in FIG. 3, at some periodic rate (e.g., every 500 microseconds), the motion profile generator 40 injects a desired rotor position into the summing junction 45. The actual rotor position of the motor 35, as provided by the encoder 60 as described below, is subtracted from the desired position to provide a position error. The position error is injected into the digital filter 50 which in turn outputs a DAC (digital to analog converter) value that is proportional to the desired instantaneous torque.

In one embodiment, the digital filter 50 is a PID (proportional, integral, derivative) controller. It should be appreciated, however, that the digital filter 50 may be based on any suitable algorithm that converts position error into a DAC value that gets injected into the power stage 55 (also referred to as an amplifier or drive). For example, the digital filter 50 may be a PI (proportional, integral) controller, a lead/lag controller, or some other suitable closed loop controller.

The output of the power stage 55 is typically electrical current (but can be a voltage) that is provided to the motor 35 that ultimately provides the desired quality of motion at the primary tractor set 10. The DAC value is scaled accordingly to match the inputs and outputs of the power stage 55. For example, many commercially available amplifiers use ±10 VDC as an acceptable analog input signal. The power stage 55 converts this input signal into and outputs a winding current that is proportional to the input signal. In lieu of an analog output, the digital filter 50 may output a digital value whereby the power stage 55 can accept this digital value and accomplish the same as the analog version.

The winding current is delivered to the motor 35 and is proportional to the desired output torque of the motor 35. This ultimately provides the desired motion to the primary tractor set 10. An encoder 60, or other suitable feedback device, is located somewhere on the motor shaft of the motor 35 or on the driven mechanism and provides the actual rotor position of the motor 35 back to the summing junction 45, completing the outer closed loop (the control loop within the power stage 55 is commonly referred to as the inner loop).

As is known in the art, a PID controller (sometimes referred to as a PID filter) is a generic control loop feedback mechanism widely used in industrial control systems. A PID controller attempts to correct the error between a measured process variable and a desired set point by calculating and then outputting a corrective action that can adjust the process accordingly.

The PID controller calculation (i.e., algorithm) involves three separate parameters: the proportional, the integral and the derivative values. The proportional value determines the reaction to the current error, the integral value determines the reaction based on the sum of recent errors and the derivative value determines the reaction to the rate at which the error has been changing. The weighted sum of these three actions, based on a coefficient associated with each one, is used to adjust the process via a control element such as the rotor position of a motor like motor 35.

For a typical closed loop motion control system, such as the motion control subsystem 30, hardware and filter coefficient gains are typically held constant and the torque command provided to the power stage 55 is updated periodically at the servo update rate, sometimes referred to as the tick rate. Proper determination of the filter coefficients, commonly referred to as tuning the servo motor, is a function of inertial and friction loading reflected back to the servo motor, such as the motor 35.

Tuning coefficients directly impact the quality of motion provided by the primary tractor set 10, which generally refers to one or more of the following metrics: position error, velocity or position overshoot and settling time. If the motor 35 or the power stage 55 is not adequately sized, the desired quality of motion cannot be achieved and/or be sustained over periods of continuous operation. An example of a tuning procedure is a step response method, which has been demonstrated to be effective at providing desired overshoot and settling time, while keeping position error to an acceptable limit.

PID filters are executed at a specific frequency, such as 2 KHz. Therefore, every 500 microseconds (corresponds to one tick time at 2 KHz), the filter gets executed and a new output is calculated. Generally, the output is a value in percentage of full output and ranges from −100.0 to +100.0 percent. This value is input into the power stage 55 as a current command (sometimes referred to as a torque command). The output of a PID filter which may implement the digital filter 50 is computed at each periodic tick time according to the following equation:

$$DAC(n)=Kp*E(n)+Kd[E(n)-E(n-1)]+Ki*SE(n),$$

where Kp, Kd and Ki are tuning coefficients and wherein n is the sample tick time, E(n) is the position error at tick time n [Desired Position (n)—Actual Position (n)], E(n−1) is the position error at the previous tick time (n−1), DAC(n) is the output of the digital filter 50 at time n, Kp is the proportional gain coefficient, Kd is the derivative gain coefficient, Ki is the integral gain coefficient, and SE(n) is the sum of recent errors.

The proportional gain coefficient, Kp, produces an output that is proportional to the error E (n), and in a direction to reduce the error. In this way, it behaves much like a spring, with the higher the Kp, the stiffer the spring. If used alone, the output will oscillate just as a spring will, and therefore the Kd term is almost always used in conjunction with this control. If the proportional gain coefficient, Kp, is too high, the system will be unstable and will oscillate. If it is too low, the system will be sluggish and will show large errors at all times.

The derivative gain coefficient, Kd, produces an output that is proportional to the derivative of the error for E(n)−E(n−1). Its primary purpose is to provide damping. For example, the error may be large and the Kp term may be producing a positive output, but if the derivative of the error is a large negative value, this means the error is reducing quickly. At this point, it is advantageous to reduce the output, or even make it negative. Even though the error is still positive, the output must be reduced to avoid a large position overshoot since the servo is rapidly approaching its desired position. If this coefficient is too high, high frequency objectionable audible noise will occur. If it is too low, the system will be unstable and will oscillate.

The integral gain coefficient, Ki, produces an output that is proportional to the sum of recent errors SE(n). If a motor stops and there is any error at all, this sum will grow. At some point, the product of SE(n) and Ki will be high enough to produce movement in the direction to reduce the error. In practice, the sum SE(n) is limited to some predetermined value to prevent damage to the mechanism if the mechanism were to jam. If this coefficient is too high, the system will oscillate at a fairly low frequency as it hunts back and forth for the desired position. If it is too low, the steady state position error may be high, and the system will not try to correct it.

As stated elsewhere herein, it has been found that the accuracy and repeatability of cut sheets in a web cutter may vary, particularly during high speed operation, due to three sources of position error on the primary tractor set 10 (without the present invention being implemented). The first source is the presence of large overshoot position errors at the end of the tractor set motion profile. At high cut rates, the tractor set deceleration is large (on the order of 40 Gs) and results in position overshoot at the end of the move. When this occurs, the web 4 will translate slightly past the desired rest position and then back up while the blade 14 of the guillotine assembly 12 is making contact with the web 4.

The second source of error is the position error required by the motor control subsystem 30 to overcome the static friction of the primary tractor set 10 when it is at rest. If the static friction of the primary tractor set 10 is large, it will take a large position error to generate enough torque at the motor 35 overcome it. This results in a position error that can be either upstream or downstream of the desired rest position.

The third source of error is the presence of the downstream tugging force produced by the ejection roller assembly 18. As described elsewhere herein, this tugging force is important to guarantee that when cut sheets 26 are cut, they are rapidly evacuated away from the blade 14 so that the advancing paper web 4 does not collide with the exiting cut sheet 26. The magnitude of the tugging force produces a downstream position error of the motor control subsystem 30 in order to generate a force that is equal and opposite. This results in the web 4 having a downstream position error when the blade 14 strikes the paper. For conservative estimates, it is assumed that all three of these sources of position error can be superimposed and will ultimately have a negative effect on cut sheet length repeatability and accuracy.

In one embodiment, the present invention provides a servo control method that momentarily increases the proportional gain coefficient, Kp, and the derivative gain coefficient, Kd, of the motor control subsystem 30 just prior to and during the time when the blade 14 strikes and cuts the web 4. In another embodiment, Kd is increased as well because, as previously described, Kd is frequently used in conjunction with Kp for system stability. If Kp were increased significantly without also increasing Kd, the motor control subsystem 30 will likely become unstable, but will reach instability in less time.

By increasing Kp momentarily, the mechanical stiffness of the primary tractor set 10 is momentarily increased during the physical cut, thereby reducing the position error during the cut. Once the blade 14 has severed the web 4, both coefficients are returned to their original values before the motor control subsystem 30 has enough time to become unstable and oscillate at the higher gains. With use of the present invention, the actual measured position error of the web 4 during the cutting operation may be decreased dramatically, typically by nearly a factor of 3, thereby making the length of the cut sheets 26 more accurate and repeatable by the same amount.

In order to implement the method of the present invention, three new parameters are introduced into the motor control subsystem 30 as follows: (1) TSB (Tractor Stopping Boost), which is the multiplier applied to the Kp and Kd coefficients just prior to and during the physical cut; (2) TSBDx (Tractor Stopping Boost Distance), which is the distance the primary tractor set 10 is from the commanded rest position before applying the boost (TSB); and (3) TSBTx (Tractor Stopping Boost Time), which is the time actually allowed to elapse after the primary tractor set 10 has reached the commanded rest position before the boost (TSB) is removed (i.e., the coefficients are returned to their original values).

In practice, it has been found that a TSB value of 2.75, a TSBDx of 5 millimeters, and a TSBTx value of 4 milliseconds will provide desirable results without destabilizing the primary tractor set 10 when the invention is implemented in the web cutter 2. As will be appreciated, other methods to temporarily increase the gains of the motor control subsystem 30 are also available.

It will be apparent to those skilled in the art that various modifications and variations can be made to the structure and methodology described herein. Thus, it should be understood that the invention is not limited to the examples discussed in the specification. Rather, the present invention is intended to cover modifications and variations. For example, and without limitation, although tractor assemblies are shown in FIG. 2, they can be replaced with hard control nips to accommodate the processing of pinless web stock. In addition, the present invention is not limited to use with web cutters, but instead may be used with other paper handling systems.

What is claimed is:

1. A method of operating a motor for driving a web handling mechanism structured to selectively move a web toward a blade of a web cutter, the motor being controlled by a closed loop servo control system employing a digital filter, the digital filter employing one or more gain coefficients, the method comprising:
   increasing one or more of the gain coefficients by a corresponding first predetermined amount when the motor reaches a coefficient boost motor position, the coefficient boost motor position being a predetermined distance before a commanded motor rest position, wherein the commanded motor rest position corresponds to a position of the web handling mechanism at which the blade cuts the web; and
   decreasing the one or more of the gain coefficients by a corresponding second predetermined amount a predetermined time after the motor reaches the commanded motor rest position.

2. The method according to claim 1, wherein increasing comprises increasing the one or more of the gain coefficients from a corresponding original value to a corresponding boosted value, and wherein decreasing comprises returning the one or more of the gain coefficients to its corresponding original value.

3. The method according to claim 2, wherein increasing comprises multiplying the one or more of the gain coefficients by a corresponding multiplier.

4. The method according to claim 3, wherein the multiplier is 2.75, wherein the predetermined distance is 5 mm, and wherein the predetermined time is 4 ms.

5. The method according to claim 1, wherein the digital filter comprises a PID filter, and wherein the one or more of the gain coefficients comprise a proportional gain coefficient and a derivative gain coefficient.

6. The method according to claim 1, wherein the web handling mechanism comprises a primary tractor set.

7. The method according to claim 3, wherein the digital filter comprises a PID filter, and wherein the one or more of the gain coefficients comprise a proportional gain coefficient and a derivative gain coefficient.

8. The method according to claim 7, wherein the multiplier is 2.75, wherein the predetermined distance is 5 mm, and wherein the predetermined time is 4 ms.

9. A web cutter for cutting a web, comprising:
   a blade for selectively cutting the web;

a web handling mechanism structured to selectively move the web toward the blade; and a motor system for driving the web handling mechanism, the motor system including a motor and a closed loop servo control system controlling the motor, the closed loop servo control system employing a digital filter, the digital filter employing one or more gain coefficients, the closed loop servo control system being adapted to:

increase one or more of the gain coefficients by a corresponding first predetermined amount when the motor reaches a coefficient boost motor position, the coefficient boost motor position being a predetermined distance before a commanded motor rest position, wherein the commanded motor rest position corresponds to a position of the web handling mechanism at which the blade cuts the web; and decrease the one or more of the gain coefficients by a corresponding second predetermined amount a predetermined time after the motor reaches the commanded motor rest position.

10. The web cutter according to claim 9, wherein the closed loop servo control system is adapted to increase the one or more of the gain coefficients from a corresponding original value to a corresponding boosted value, and to decrease the one or more of the gain coefficients to its corresponding original value.

11. The web cutter according to claim 9, wherein the closed loop servo control system is adapted to multiply the one or more of the gain coefficients by a corresponding multiplier.

12. The web cutter according to claim 11, wherein the multiplier is 2.75, wherein the predetermined distance is 5 mm, and wherein the predetermined time is 4 ms.

13. The web cutter according to claim 9, wherein the digital filter comprises a PID filter, and wherein the one or more of the gain coefficients comprise a proportional gain coefficient and a derivative gain coefficient.

* * * * *